United States Patent

[11] 3,622,649

[72] Inventors Harold E. Swift
Gibsonia;
Ching-Yong Wu, O'Hara Township, Allegheny County, both of Pa.
[21] Appl. No. 850,642
[22] Filed Aug. 15, 1969
[45] Patented Nov. 23, 1971
[73] Assignee Gulf Research & Development Company
Pittsburgh, Pa.

[54] DIMERIZATION OF PROPYLENE TO 2,3-DIMETHYLBUTENES
9 Claims, No Drawings
[52] U.S. Cl. .................................................. 260/683.15
[51] Int. Cl. ....................................................... C07c 3/18
[50] Field of Search ............................................ 260/683.15 D

[56] References Cited
UNITED STATES PATENTS

| | | | |
|---|---|---|---|
| 3,467,726 | 9/1969 | Griffin .......................... | 260/683.15 |
| 3,482,001 | 12/1969 | Eberhardt ..................... | 260/683.15 |
| 3,485,892 | 12/1969 | Griffin et al. ................. | 260/683.15 |
| 3,513,218 | 5/1970 | Faltings et al................. | 260/683.15 |

Primary Examiner—Paul M. Coughlan, Jr.
Attorneys—Meyer Neishloss, Deane E. Keith and Richard C. Gaffney ABSTRACT: Propylene is converted to a mixture of $C_6$ olefins with high efficiency, usually over 70 percent, to 2,3-dimethylbutenes using a highly specific catalyst system and a highly specific solvent at a temperature less than about 10° C. The catalyst system comprises $NiCl_2$, triisopropylphosphine and an aluminum alkyl chloride or dichloride. The solvent is a dichlorinated benzene.

DIMERIZATION OF PROPYLENE TO 2,3-DIMETHYLBUTENES

This invention relates to a process for the dimerization of propylene in high efficiency to 2,3-dimethylbutenes.

The dimerization of propylene and other olefins by a variety of catalysts is well known in the art. Propylene normally dimerizes to form methylpentenes and n-hexenes, which $C_6$ olefins are not as valuable as the 2,3-dimethylbutenes which can be hydrogenated to form 2,3-dimethylbutane, a high octane motor fuel component. It is desirable, therefore, to find a system for directing the dimerization of propylene to form the more valuable 2,3-dimethylbutenes. Catalyst systems have been suggested in the art for the dimerization of propylene and attempts have been made to selectively direct the reaction to the formation of the desired 2,3-dimethylbutenes (see U.S. Pat. No. 3,390,201). However, the prior art catalyst systems have been relatively weak and require the use of stabilizers (promoters) or the selectivity to the formation of the 2,3-dimethylbutenes, while improved over the use, say, of sulfuric acid, is still too low (10 to 60 percent) to be of real commercial interest. To be commercially attractive the catalyst system must be as simple as possible while providing for the dimerization of propylene with a selectivity in excess of about 70 percent, preferably in excess of 75 percent, to the desired 2,3-dimethylbutenes. A highly specific catalyst system in combination with a low temperature and a specific solvent has now been discovered which overcomes the disadvantages of the prior art systems and provides a commercially attractive process.

In accordance with the invention, a process has now been discovered for the selective conversion of propylene to 2,3-dimethylbutenes which comprises:

reacting propylene at a temperature less than about 10° C. in the contact presence of a liquid dichlorinated benzene solvent and a catalyst complex comprising $NiCl_2$, triisopropylphosphine and an alkyl aluminum chloride having the formula $AlR_nCl_{3-n}$ where R is an alkyl group having from one to six carbon atoms and n has a value from one to two and wherein said complex the mole ratio of phosphorus to nickel is from 0.5:1 to 2.5:1 and the aluminum to nickel mole ratio is from 2:1 to 7:1.

The charge stock olefin is propylene and its source is not critical so long as it is free of contaminants which adversely interact with a catalyst system to be defined below. Substantially pure propylene may be employed as may a gas containing from 30 to 100 volume percent propylene, preferably from 50 to 100 volume percent of propylene. A suitable source of reduced propylene content gases is a refinery propane-propylene stream obtained from a catalytic cracking unit. These streams normally contain between 60 and 80 volume percent propylene and are suitable for use in the process of this reaction provided they are free of interfering contaminants such as indicated above. Interfering contaminants include water, $CO_2$, sulfur compounds, organic acids or other oxygen containing materials which are known to interact readily with aluminum alkyls.

The reaction occurs by passing propylene or a propylene containing gas into liquid dichlorobenzene containing a preformed catalyst complex. The catalyst complex consists of three specific components which are admixed in the presence of dichlorobenzene. The three catalyst components include (1) nickel chloride ($NiCl_2$), (2) an alkyl aluminum chloride having the general formula $AlR_nCl_{3-n}$ where R is an alkyl group having from one to six carbon atoms and n has a value from one to two, and (3) triisopropylphosphine. Particularly suitable aluminum components include, but are not limited to, diethylaluminumchloride, ethylaluminumdichloride and the well-known ethylaluminumsesquichloride which is a mixture of diethylaluminumchloride and ethylaluminumdichloride, propylaluminumdichloride and hexylaluminumdichloride.

The molar ratio of the catalyst components to each other is important to obtain the best results. For example, the molar ratio of phosphorus to nickel is suitably from 0.5:1 to 2.5:1, preferably from 0.75:1 to 1.5:1, and is optionally about 1:1. Similarly, the molar ratio of aluminum to nickel is suitably from 2:1 to 7:1, preferably from 2.5:1 to 6.5:1, and is optimally from 4:1 to 6:1.

The manner of addition of the various catalyst components to each other to form the desired complex is not critical. Normally, the nickel chloride and phosphine are added to the dichlorobenzene solvent followed by the addition of the aluminum component.

The amount of the catalyst complex dissolved in the reaction system is not critical and is suitably from 0.05 to 5 weight percent or more based on the total weight of the catalyst and solvent and is preferably from 0.15 to 2.5 weight percent.

The dichlorinated benzene solvent can be any of the liquid dichlorinated forms or a mixture of one or more of the ortho, meta and paradichlorobenzenes, so long as the mixture is liquid under the conditions of the reaction so it may function as a solvent. The use of monochlorinated benzenes gives unsatisfactory selectivities as do alkylated aromatics such as toluene, while the use of most trichlorinated benzenes is unsuitable due to their high melting points. Thus, the use of the dichlorinated benzenes is unique, and ortho dichlorobenzene is preferred.

It is an important feature of the process of this invention to maintain the dimerization reaction temperature less than about 10° C. Temperatures too far above 10° C., for example, 25° C., result in decreased efficiencies to the production of the desired 2,3-dimethylbutenes. The lower temperature limit is the melting point of the reaction system, for the reaction system must be maintained in the liquid phase. The lower temperature limit is about −20° C. The preferred reaction temperature are from −15° to 5° C. with the optimum temperatures being from −10° to 0° C.

The dimerization reaction conditions, except for temperature, are not critical. Thus, any suitable pressure can be employed, for example, a pressure from 0 to 500 p.s.i.g. or more; however, pressures are usually in the range of 0 to 100 p.s.i.g. The reaction time may be quite short for the reaction is substantially instantaneous and is limited only by mass transfer considerations. Suitable reaction times are as short as 1 minute or less but are usually from 30 minutes to 4 hours or more to allow for proper mixing and slow addition of propylene if desired.

The propylene is added to the solution of the catalyst complex in the dichlorinated benzene through a sparger or other device which breaks up the propylene into small bubbles. Agitation of the contents of the reaction zone is preferred in order to insure better contacting between the propylene and the catalyst.

Reaction may be carried out continuously or batchwise as desired, or even in a coil-type reactor.

The invention will be further described with reference to the following experimental work. In all of the experiments to follow, either the CP grade propylene or the propylene-propane refinery stream were passed through a column of molecular sieves to reduce their moisture content. All solvents were distilled, stored under a nitrogen atmosphere, and dried with molecular sieves. The organoaluminum compounds and phosphines were, of course, stored under a nitrogen atmosphere at all times. The nickel chloride employed was also, of course, anhydrous.

The procedure for a typical propylene dimerization experiment was as follows. Into a 300 milliliter thick wall glass reactor with a 200 p.s.i.g. safety pressure release disc was added 1.5 millimoles of anhydrous nickel chloride and 1.5 millimoles of triisopropylphosphine in 50 milliliters of orthodichlorobenzene. This was followed by addition of a solution of 3.7 millimoles of ethylaluminumsequichloride in 50 milliliters of orthodichlorobenzene. The reactor was then sealed and the mixture agitated with a magnetic stirrer. The reactor was then cooled to −10° C. and propylene was introduced at the rate of 0.56 liters per minute for 20 minutes to give 0.5 moles of propylene in the reactor. The temperature was maintained at $-10\pm5°$ C. The maximum pressure during the charge of propylene was 4 p.s.i.g. and it dropped to 0 in less than 30 minutes. After an additional hour of stirring at $-10°$ C. the temperature was brought to room temperature. No unreacted propylene was recovered.

Two separate gas liquid chromatographic analyses were made to determine conversion and selectivity values. To obtain data for the determination of conversion, a 10-foot column ¼-inch O.D. packed with 10 percent Carbowax on chromosorb W was temperature programmed linearly at a rate of 10° per minute. For selectively determination, a 50-foot column ⅛-inch O.D. packed with 30 percent adiponitrile on chromosorb P was used isothermally at 50° C. Using the second column, separate gas liquid chromatographic peaks were obtained for cis-4-methyl-2-pentene, 2,3-dimethyl-1-butene; trans-3-hexene; 2-methyl-2-pentene; cis-2-hexene and 2,3-dimethyl-2-butene, but unresolved peaks were obtained for a mixture of 4-methyl-1-pentene, and trans-4-methyl-2-pentene and for a mixture of 2-methyl-1pentene and trans-2-hexene.

A first series of runs was made to show the effect of various phosphine ligands and solvents on the selectivity of the system for the production of the desired 2,3-dimethylbutenes. In all of these runs the system consisted of 1.5 millimoles of nickel chloride ($NiCl_2$); 1.5 millimoles of the phosphine; 3.7 millimoles of ethylaluminumsesquichloride; 100 milliliters of solvent and 0.5 moles of propylene. The reaction was run in most cases at

TABLE I.—EFFECT OF PHOSPHINE LIGAND

| Example No.: | Phosphine | Solvent | Conversion | Selectivity |
|---|---|---|---|---|
| 1 | Triisopropylphosphine | o-Dichlorobenzene | 90-95 | 76-81 |
| 2 | Tricyclohexylphosphine | do | 95 | 56 |
| 3 | Tri-n-butylphosphine | do | 98 | 30 |
| 4 | Triphenylphosphine | do | 98 | 12 |
| 5 | Triisopropylphosphine | Toluene | 82 | 49 |
| 6 | Tricyclohexylphosphine | do | 78 | 48 |
| 7 | Tri-n-butylphosphine | do | 97 | 22 |
| 8 | Triphenylphosphine | do | 88 | 8 |
| 9 | Triisopropylphosphine | Chlorobenzene | 90 | 55 |

$-10°$ C. for 2 hours at atmospheric pressure. The results of the runs are shown in table I above.

Referring to table I, it can be seen that triisopropylphosphine in orthodichlorobenzene gave the highest conversion with the highest selectively to 2,3-dimethylbutenes. The selectivity dropped dramatically when tri-n-butylphosphine or triphenylphosphine were employed in orthodichlorobenzene (examples 3 and 4). Results in examples 5-9 show that both the conversion and the selectivity to the production of 2,3-dimethylbutenes suffered when toluene or chlorobenzene were employed in place of orthodichlorobenzene as the solvent. For example, even with triisopropylphosphine the selectivity in toluene was reduced from 81 percent (example 1) to 49 percent (example 5) and the conversion from 95 percent to 82 percent.

Thus, the data in table I shows that in order to obtain the high conversions and high selectivities (above 75 percent) to the production of 2,3-dimethylbutenes, it is critical to employ orthodichlorobenzene as the solvent and to utilize triisopropylphosphine as the phosphine liquid.

A second series of runs were made showing the effect of temperature and solvent on the selectivity to produce 2,3-dimethylbutenes using a catalyst system composed of 1.5 millimoles of $NiCl_2$; 3.7 millimoles of aluminum sesquichloride and 1.5 millimoles of triisopropylphospine. The results are shown in table II below.

Table II

| Example No.: | 10 | | 12 |
|---|---|---|---|
| Solvent: | Toluene | Chlorobenzene | o-Dichlorobenzene |
| % Selectivity to 2,3-dimethylbutenes: | | | |
| $-10°$ C. | 48 | 55 | 82 |
| 0° C. | 47 | 56 | 72 |
| 25° C. | 46 | 54 | 55 |

Referring to table II, it can be seen that temperatures from $-10°$ to 25° C. have little, if any, effect on the selectivity of the process for the production of 2,3-dimethylbutenes when toluene or chlorobenzene are used as the solvents (examples 10 and 11). Quite unexpectedly, temperature has a telling effect on the yield of 2,3-dimethylbutenes when o-dichlorobenzene is used as the solvent (example 12). At 25° C., the effect of o-dichlorobenzene is about the same as chlorobenzene, which is similar to the effect of toluene. At 0° C., the percent selectivity to 2,3-dimethylbutenes jumps from 55 percent to over 70 percent when o-dichlorobenzene is used as the solvent (example 12). This was totally unexpected in view of the data obtained using toluene or chlorobenzene (examples 10 and 11). Further improvements in selectivity were obtained by operating at $-10°$ C. as shown in example 12.

A third series of runs was now made with a refinery mixture of propane and propylene or with a synthetic mixture of propane and propylene. The propane-propylene mixture was dried by passing it through a 2-foot column of molecular sieves. The gas mixture was introduced at 100 p.s.i.g. head pressure to prevent condensation of propane in the gas line. The results of this series of experiments are shown in table III below.

Referring to table III below, example 13 using an untreated propane-propylene refinery stream resulted in poor conversions and selectivities to the formation of the desired 1,2-dimethylbutenes. Pretreatment of the refinery propane-propylene stream with molecular sieves to reduce the water and sulfur content resulted, as shown in example 14, in excellent conversions and improved selectivities. The use of a synthetic mixture of 68 mole percent pure propylene and 32

TABLE III.—DIMERIZATION WITH PROPYLENE-PROPANE MIXTURE

| Ex. No. | Charge | Mole percent propylene | Total charge, mole | Temp., ° C. | Hours | Conversion, mole percent | Selectivity, mole percent |
|---|---|---|---|---|---|---|---|
| 13 | Refinery propane-propylene stream.[1] | 67 | 1.0 | $-10$ | 2 | 10 | 56 |
| 14 | Refinery propane-propylene stream.[2] | 67 | 1.0 | $-10$ | 2 | 98 | 70 |
| 15 | Synthetic mixture [3] | 68 | 1.0 | $-10$ | 2 | 89 | 80 |

[1] Contains about 200 p.p.m. of $H_2O$ and about 8 p.p.m. of sulfur
[2] Pretreated with molecular sieves to reduce $H_2O$ and sulfur.
[3] Pure propylene mixed with pure grade propane.

mole percent pure propane resulted in greatly improved selectivities and conversions over the untreated refinery stream as shown by a comparison of examples 13 and 15.

In all of the tables of data, the conversion figures are in mole percent and indicate the mole percent of the propylene in the charge stock which has been converted. The selectivity figures in all of the tables are also in mole percent and indicate the mole percent of the propylene converted which is present in the product as the desired 2,3-dimethylbutenes.

Resort may be had to such variations and modifications as fall within the spirit of the invention and the scope of the appended claims.

We claim:

1. A process for the selective conversion of propylene to dimethylbutenes which comprises:

reacting propylene at a temperature less than about 10° C. in the contact presence of ortho-dichloro benzene as a solvent and a catalyst complex comprising $NiCl_2$, triisopropylphosphine and an alkyl aluminum chloride having the formula $AlR_nCl_{3-n}$ where R is an alkyl group having from one to six carbon atoms and $n$ has a value from 1 to 2 and wherein said complex the mole ratio of phosphorus to nickel is about 1:1 and the aluminum to nickel mole ratio is from 2:1 to 7:1.

2. A process according to claim 1 wherein the alkyl group in the alkyl aluminum chloride catalyst component is ethyl.

3. A process according to claim 2 wherein the reaction temperature is from −15° C. to 5° C.

4. A process according to claim 3 wherein the molar ratio of aluminum to nickel is from 2.5:1 to 6.5:1.

5. A process according to claim 1 plus recovering a reaction product comprising at least 70 percent by weight of dimethylbutenes 6. A process for the selective dimerization of propylene in a propylene containing gas to a mixture of 2,3-dimethyl-dimethylbutenes -butene and 2,3-dimethyl-2-butene which comprises contacting said propylene containing gas with a catalyst complex dissolved in ortho-dichloro benzene as a solvent under dimerization conditions, including a temperature below about 10° C., said catalyst complex comprising $NiCl_2$, triisopropylphosphine and an alkyl aluminum chloride having the formula $AlR_nCl_{3-n}$ where R is an alkyl group having from one to six carbon atoms and $n$ has a value from 1 to 2 and wherein said complex the mole ratio of phosphorus to nickel is about 1:1 and the aluminum to nickel mole ratio is from 2:1 to 7:1.

7. A process according to claim 6 wherein the propylene containing gas is substantially pure propylene.

8. A process according to claim 6 wherein the propylene containing gas is a refinery propane-propylene stream containing from 50 to 100 volume percent propylene.

9. A process according to claim 7 wherein the aluminum alkyl chloride is ethyl aluminumsesquichloride.

* * * * *

PO-1050
(5/69)

UNITED STATES PATENT OFFICE
CERTIFICATE OF CORRECTION

Patent No. 3,622,649     Dated November 23, 1971

Inventor(s) Harold E. Swift and Ching-Yong Wu

It is certified that error appears in the above-identified patent and that said Letters Patent are hereby corrected as shown below:

Col. 1, lines 39 and 65; Col. 5, line 4; and Col. 6, line 15, "$AIR_nCl_{3=n}$" should be -- $AlR_nCl_{3-n}$ --.

Col. 2, line 70, "ethylaluminumsequichloride" should be -- ethylaluminumsesquichloride --.

Col. 3, line 4, "-100°C." should be -- -10°C. --.

Col. 4, Table II, the Example No. "11" should be inserted over the "Chlorobenzene" column.

Col. 6, lines 8 and 9, "2,3-dimethyl-dimethylbutenes-butene" should read -- 2,3-dimethyl-1-butene --.

Col. 5, lines 4 through 27, and Col. 6, line 1 - should be rearranged to read as follows:

In all of the tables of data, the conversion figures are in the mole percent and indicate the mole percent of the propylene in the charge stock which has been converted. The selectivity figures in all of the tables are also in mole percent and indicate the mole percent of the propylene converted which is present in the product as the desired 2,3-dimethylbutenes.

Resort may be had to such variations and modifications as fall within the spirit of the invention and the scope of the appended claims.

We claim:

1. A process for the selective conversion of propylene to dimethylbutenes which comprises:

[Continued on page 2]

PO-1050
(5/69)

UNITED STATES PATENT OFFICE
CERTIFICATE OF CORRECTION

Patent No. 3,622,649      Dated November 23, 1971

Inventor(s) Harold E. Swift and Ching-Yong Wu

It is certified that error appears in the above-identified patent and that said Letters Patent are hereby corrected as shown below:

[Page 2]

reacting propylene at a temperature less than about 10°C. in the contact presence of ortho-dichloro benzene as a solvent and a catalyst complex comprising $NiCl_2$, triisopropylphosphine and an alkyl aluminum chloride having the formula $AlR_nCl_{3-n}$ where R is an alkyl group having from one to six carbon atoms and n has a value from 1 to 2 and wherein said complex the mole ratio of phosphorus to nickel is about 1:1 and the aluminum to nickel mole ratio is from 2:1 to 7:1.

2. A process according to claim 1 wherein the alkyl group in the alkyl aluminum chloride catalyst component is ethyl.

3. A process according to claim 2 wherein the reaction temperature is from -15°C. to 5°C.

Signed and sealed this 4th day of July 1972.

(SEAL)
Attest:

EDWARD M. FLETCHER, JR.
Attesting Officer

ROBERT GOTTSCHALK
Commissioner of Patents